United States Patent
Giovannini

(10) Patent No.: US 10,123,481 B2
(45) Date of Patent: Nov. 13, 2018

(54) SWATHER WITH A SINGLE OR DOUBLE RAKING FRAME, DEVICE FOR ARMS WITH WHEEL RAKES AND CORRESPONDING WHEEL RAKES

(71) Applicant: Enoagricola Rossi S.R.L., Perugia (IT) (IT)

(72) Inventor: Adelmo Giovannini, Perugia (IT)

(73) Assignee: Enoagricola Rossi S.R.L., Perugia (IT)

( * ) Notice: Subject to any disclaimer, the term of this patent is extended or adjusted under 35 U.S.C. 154(b) by 280 days.

(21) Appl. No.: 14/427,011

(22) PCT Filed: Sep. 10, 2013

(86) PCT No.: PCT/IB2013/058434
§ 371 (c)(1),
(2) Date: Mar. 10, 2015

(87) PCT Pub. No.: WO2014/041482
PCT Pub. Date: Mar. 20, 2014

(65) Prior Publication Data
US 2015/0237801 A1    Aug. 27, 2015

(30) Foreign Application Priority Data

Sep. 11, 2012  (IT) ............................ PG201200023 U
Sep. 11, 2012  (IT) ............................ PG201200024 U
Sep. 11, 2012  (IT) ............................ PG201200025 U

(51) Int. Cl.
*A01D 57/28* (2006.01)
*A01D 78/14* (2006.01)
(Continued)

(52) U.S. Cl.
CPC ............. *A01D 57/28* (2013.01); *A01D 57/12* (2013.01); *A01D 78/14* (2013.01); *A01D 78/146* (2013.01); *A01D 80/00* (2013.01)

(58) Field of Classification Search
CPC ........ A01D 57/12; A01D 57/28; A01D 57/30; A01D 78/001; A01D 78/005;
(Continued)

(56) References Cited

U.S. PATENT DOCUMENTS 2,271,304 A  *  1/1942  Mulholland  ........... B60G 11/14
                                                              16/44
2,543,948 A  *  3/1951  Wiedman  ................. B60D 1/66
                                                              16/44

(Continued)

FOREIGN PATENT DOCUMENTS

DE        1116463 B    11/1961
GB         891191      3/1962

*Primary Examiner* — Robert E Pezzuto
*Assistant Examiner* — Adam J Behrens
(74) *Attorney, Agent, or Firm* — Howson & Howson LLP

(57) ABSTRACT

A swather having a horizontal bar with a device for connection to a towing vehicle and a generally horizontal bar, transverse to the first one, each end of which is associated with a generally vertical member bearing a wheel. The assembly of the transverse bar and the vertical members being associated with generally horizontal long arms directed toward a first end of the first horizontal bar and pivotally connected to the transverse bar or the vertical members, so that the arms, when extended to a working position, provide a V-shaped or Y-shaped configuration. Each arm is equipped with a pivoting wheel with tire at its end remote from the transverse bar, or distal end, and with wheel rakes. At least the pivoting wheels with tires are equipped with shock absorbing means capable of attenuating impulsive loads due to impact of the wheels against ground irregularities.

8 Claims, 9 Drawing Sheets

(51) Int. Cl.
*A01D 80/00* (2006.01)
*A01D 57/12* (2006.01)

(58) Field of Classification Search
CPC ........ A01D 78/14–78/148; A01D 80/00; F16F 7/00; F16F 15/02
USPC .......................................... 188/1.12; 267/136
See application file for complete search history.

(56) References Cited

U.S. PATENT DOCUMENTS

| | | | | |
|---|---|---|---|---|
| 2,564,996 A | * | 8/1951 | Rasbach | B62D 53/0857 16/44 |
| 2,568,261 A | * | 9/1951 | Stade | B62D 53/0857 16/44 |
| 2,860,478 A | * | 11/1958 | Van Der Lely | A01D 78/148 56/377 |
| 2,891,764 A | * | 6/1959 | Pearne | B66F 3/24 16/44 |
| 2,977,737 A | * | 4/1961 | Newcomer | A01D 82/00 267/255 |
| 3,050,926 A | * | 8/1962 | Van Der Lely | A01D 78/142 185/39 |
| 3,435,599 A | * | 4/1969 | Engler | A01D 34/63 280/43.2 |
| 3,784,230 A | * | 1/1974 | Worrall, Jr. | B60D 1/56 280/415.1 |
| 3,989,272 A | * | 11/1976 | McCanse | A01D 34/866 172/446 |
| 4,645,230 A | * | 2/1987 | Hammons | B62D 63/061 16/20 |
| 4,932,197 A | | 6/1990 | Allen | |
| 5,066,030 A | * | 11/1991 | Brett | B60G 3/185 180/215 |
| 5,103,530 A | * | 4/1992 | Andrisin, III | B60B 33/0042 16/20 |
| 5,664,796 A | * | 9/1997 | Huyzers | B60D 1/07 254/333 |
| 6,568,030 B1 | * | 5/2003 | Watanabe | B60B 33/045 16/19 |
| 6,789,810 B2 | * | 9/2004 | Strong | B60B 33/045 16/18 R |
| 7,712,297 B1 | | 5/2010 | Giovannini et al. | |
| 8,240,118 B1 | * | 8/2012 | Johnson | A01D 78/146 56/368 |
| 8,657,025 B2 | * | 2/2014 | Thompson | A01B 73/067 172/311 |
| 2005/0284125 A1 | | 12/2005 | Giovannini | |
| 2005/0284126 A1 | | 12/2005 | Giovannini | |
| 2006/0185342 A1 | | 8/2006 | Hruska et al. | |
| 2007/0074499 A1 | | 4/2007 | Giovannini | |
| 2010/0251686 A1 | | 10/2010 | Giovannini et al. | |
| 2011/0017480 A1 | * | 1/2011 | Thompson | A01B 73/067 172/1 |

* cited by examiner

SWATHER WITH A SINGLE OR DOUBLE RAKING FRAME, DEVICE FOR ARMS WITH WHEEL RAKES AND CORRESPONDING WHEEL RAKES

TECHNICAL FIELD

The present invention generally relates to a swather with a single or double raking frame.

More particularly, the present invention relates to a swather having arms with wheel rakes and equipped with wheels with tyres.

The present invention also relates to a device usable for locking the arms with wheel rakes and to wheel rakes usable in the swather and the device.

PRIOR ART

Swathers and their use are known in the art.

As known, a swather is a product or system, which generally is towed by a towing vehicle driven by an operator and is used in agriculture for collecting previously cut grass, hay, specific fodders or the like, into windrows orderly arranged on the ground.

A prior art swather generally includes a first horizontal bar, having at a first end a device for connection to a towing vehicle, generally a tractor, and having at the opposite end a generally horizontal second bar, transverse to the first one, of which the ends are each associated with a generally vertical member hearing a wheel, preferably a pivoting wheel with tyre. Said assembly of the transverse bar and the vertical members is associated with long arms, directed towards said first end of the first horizontal bar and articulated onto the transverse bar or the vertical members, in such a way that the assembly can take, in use, a V-shaped or Y-shaped configuration. Suitable devices connect said arms with said first bar or said vertical members, and enable both the opening movement of the arms to the V-shaped or Y-shaped configuration, and their closing movement, with said arms being generally parallel to said first bar.

Each said arm has a pivoting wheel with tyre at the end remote from said transverse bar, or distal end, and also a plurality of wheel rakes, distributed along the arms themselves and equipped with radially arranged curved tines or with members, they too curved, arranged on the wheel circumference, said tines or said elements projecting from the circumference of the wheel rakes.

While the swather is in use, the arms are opened to take the V-shaped or Y-shaped configuration, the swather is towed along the field and the wheel rakes are made to rotate, thereby upsetting with the ends of said curved tines or said curved elements the material (grass, hay or the like) previously cut in order to favour its drying, and arranging said material in long, ordered windrows.

Several modifications have been made in time to said agricultural equipment, very schematically disclosed above, the modifications being essentially intended to improve its easiness of use, its safety, during both use and transportation, and the performance in use. For instance, the economic need to work wider and wider cultivated areas in reduced working times has led to swathers with very long arms with the wheel rakes: however, for that reason, such arms become very heavy and complex to be moved.

A first technical problem of the known swathers is that the excessive arm lengths, in combination with the often rough surfaces of the fields, has the consequence that the arms, in use, can be subjected to stresses and can develop cracks and subsequently fractures, which are a damage from the economic standpoint and are potentially dangerous for the safety of the operators and, generally, of all persons nearby.

It is also known that swathers, due to the economic need to work wider and wider cultivated areas in reduced working times, have very long arms, which, in use, arc to be brought into their open position and, during transportation, are to be safely arranged in their closed position.

A second technical problem, related to the first one, is that, at present, the arms are locked in their closed position by mechanically securing them to said first horizontal bar, for instance by means of elongated rigid elements such as metal rods, tube pieces and the like, which are provided with eyelets at their ends and are to be bolted to both the arms and the first horizontal bar.

This operation entails that the operator stops the tractor, leaves it, takes the tube pieces, bolts, nuts and keys, manually aligns the arms to said first bar, makes the connection, puts again the keys in place, gets again on the tractor and starts again. Already from this short description of the operation, one can understand that the same cannot be carried out easily and in short times, and moreover that it can also give rise to the risk that the operator hurts himself/herself during the arm alignment and securing.

Such a situation entails the further technical problem, always related to the presence of longer and longer arms, that, both during swather transportation and during some phases of use, such as for instance direction reversal in narrow areas, displacement from one field to another, and so on, it is necessary to bring the arms to their closed position and also to lock them in such position, in order to prevent the length and the weight of the arms from overcoming the resistance of the actuating means, for instance hydraulic cylinders arranged to operate the arms, thereby causing displacement of the arms from the closed to the open position, this being likely to result in damages to the arms, to the swather itself or to structures or to other means nearby or even to people.

A third, more general technical problem is related to the wheel rakes arranged along the swather arms.

Such wheel rakes are equipped along their circumference with projections consisting of shaped metal rods (star wheel rakes). When the swather is towed along a field where fodder has been cut, such wheel rakes lift the fodder and align it according to their rotation planes. The V-shaped or Y-shaped configuration taken by the swather arms causes the fodder to be displaced and arranged in windrows.

As a person skilled in the art can readily understand, such wheel rakes are essential for the use of the swather and they must be robust, in order to resist the stresses during use, in particular the shocks against the ground, and must have at the same time a simple structure.

In accordance with the prior art, such wheel rakes have for instance a structure including:
- a first strip with circular shape, having at its centre, perpendicularly to the plane of the circle formed by the strip, a bushing projecting from the plane of the circle; and
- a second strip, also with circular shape, yet having a greater diameter than the first strip;

wherein said first and second strips are connected by shaped metal rods (tines) so that a portion of said tines projects from the circumference formed by the second strip. An axle or pin connected to the swather arm through a short arm is inserted into the bushing, which can contain rolling bearings or the like.

Due to such a kind of structure, in particular to the provision of a bushing in the wheel rake, the faces of the wheel rake, on one side of the plane defined by the strips with circular shape, are asymmetrical, whereby the wheel rake has a generally conical appearance.

Also other kinds of wheel rakes for swathers are known, such as those disclosed in U.S. Pat. No. 4,932,197.

Such wheel rakes include a first and a second strip with circular shape, which are rigidly connected together by means of a set of spokes formed of metal sheet sections having the shape of very elongated rectangular trapezia, the first of said strips having a bushing for the connection of one of the swather arms, similarly to what provided for by the prior art discussed above. The members for moving the fodder consist of short pieces of steel rods, preferably mounted in pairs on bases made of vulcanised hard rubber or the like, in turn secured to the second strip with circular shape.

Also in this second kind of wheel rakes for swathers, the shape of the wheel rakes is such that the two faces of the wheel rakes, as defined above, are asymmetrical. This means that a wheel rake with a given configuration can be mounted only on one of the swather arms, and not on the other arm, whereby the manufacturer is compelled to manufacture right and left wheel rakes and the operator is compelled to buy right and left wheel rakes, thereby doubling the spare parts stock.

In general, the Applicant has realised that the prior art is not able to effectively solve the most general technical problem of making the swathers more and more effective in view of the economic need to work wider and wider cultivated areas in more and more reduced working times.

The Applicant has also realised that the prior art is not able to solve the several technical problems preventing the attainment of swathers meeting the actual needs of the operators.

DESCRIPTION OF THE INVENTION

The Applicant has set itself the aim of overcoming the different problems mentioned above by means of technical solutions that, in the whole, allow manufacturing a swather with very high efficiency.

Of course, the following synthetic description of the invention is provided in order to allow a basic understanding of some aspects of the invention.

Such a synthetic description is not a thorough description and, as such, it is not to be intended as being suitable for identifying key or critical elements of the invention or for define the scope of the invention. It is only aimed at setting forth some concepts of the invention in simplified form, as an anticipation of the detailed description below.

For instance, the Applicant, in order to solve the first technical problem, has made a swather in which at least the pivoting wheels with tyres provided at or near the distal ends of said arms, or all wheels with tyres the swather is equipped with, are equipped with shock absorbing means, capable of suppressing or at least attenuating the impulsive loads due to an impact of the wheels themselves against irregularities of the ground.

Preferably, said shock absorbing means can comprise a member including a short arm inclined with respect to a vertical axis and having a first end pivoting about such an axis and a second end pivotally connected to a second short arm generally arranged at right angle relative to the first one, the distal end of said second short arm being connected to the rotation axis of the wheel with tyre. Near its articulation with said first short arm, said second short arm has pivotally mounted thereon a resiliently deformable member, generally parallel to said first short arm and connected also to said first end of said first short arm.

More preferably, such a resiliently deformable member consists of a spring, or of a shock absorber similar to the shock absorbers for motor vehicles, or of an assembly of a spring and a shock absorber, or generally of a resilient member equally suitable for the purpose.

As to the second technical problem, which is in any case related to the first one since it is intended to solve the technical problem of making the swather structure and operation more effective, the Applicant has set itself the aim of equipping the swather with means arranged to automatically lock the arms with wheel rakes against the first central horizontal bar, and to allow such arms to be directly unlocked by an operator who, for instance, is driving the tractor towing the swather.

The aim has been achieved, in the preferred embodiment, by an automatic locking device including a first portion substantially consisting of a short small arm, preferably located along each said arm with wheel rakes and having one end articulated in correspondence of the aim with wheel rakes, the small arm being kept in a generally horizontal position by a resilient member which however allows the small arm to rotate upwards and downwards. The small arm end opposite the articulation end is equipped with a short small cylinder of metal, substantially placed in a horizontal plane, perpendicular to the axis of said small arm and rigidly connected thereto, the ends of said small cylinder being bevelled.

In accordance with the preferred embodiment, a second portion of the locking device is located in a position, on the first horizontal bar, exactly corresponding to the position where said articulated short small arms are placed on the arms with wheel rakes, and it includes locking and retaining means each generally including:

a first vertical stationary strip, having one end connected to the first horizontal bar and a free second end, directed towards said arm with wheel rakes and having a wide V-shaped cut with horizontal axis of which the tip portion is provided with a circular recess arranged to receive the short small cylinder located on said small arm;

a second strip located sideways of said first strip, the second strip being it too vertical, being rotatable about a vertical axis, being kept close to said first strip by a resilient member, having it too one end connected to the first horizontal bar and a free second end directed towards said arm with wheel rakes, and being shaped so that said second free end is bent so as to be directed away from the free end of said first strip; said second strip being provided, in correspondence of the circular recess on the tip of the V-shaped cut of the first strip, with a circular through hole arranged to receive said short small cylinder located on said small arm.

In the preferred embodiment, the free end of said second strip is associated with actuating means arranged to enable a rotary motion thereof away from said first strip, which means are controlled by an operator driving the towing tractor. Said actuating means may consist, in their simplest form, of a cable, a thin metal rod or the like, or of pneumatic, hydraulic, electromechanical actuators.

In use, when the arms with wheel rakes are closed by using the usual hydraulic pistons, near the end of the approaching movement towards the first horizontal bar, one end of the small cylinder located on the short arm contacts the bent portion of said second strip and, while continuing its approaching movement, makes the second strip rotate about its vertical axis. While the approaching movement still goes on, said small cylinder contacts an inclined wall of the V-shaped cut and slides along said inclined wall as far as it is received in said circular recess provided in the bottom of the V-shaped cut. At this point, the cylinder end is located in correspondence of the circular hole formed in said second strip, and said resilient member brings again the second strip close to the first strip, thereby locking the small cylinder in a safe and fixed position. As it can be understood, in such manner the arm with wheel rakes is securely and automatically locked in its closed position because of the same closing operation of the arm itself, without need of a direct operator's intervention.

When the arm is then to be opened again, the operator can operate the actuating means directly from its driving position, in order to release the cylinder from its seat in the circular hole of the second strip, and hence can allow the arm with wheel rakes to open to the working position.

In accordance with the present exemplary embodiment, it is also possible to connect the control of the opening of the aim with wheel rakes with the control of the small cylinder release, so as to automatically release the small cylinder when commanding the opening of the arm, thereby avoiding possible damages to the equipment.

As to the third technical problem, the Applicant has set itself the aim of obviating the drawback of having different wheel rakes for each swather arm, by providing a wheel rake with a new design, which is simple to build and is reversible, that is, it can be indifferently mounted on both arms or sides of the swather.

In general, such a novel kind of wheel rake can be mounted not only on the swather as disclosed in accordance with the present invention, but also on any kind of swather.

According to the present invention, the novel wheel rake for a swather is reversible and includes a first metal member consisting of a strip closed in circular form and having a width much smaller than its length, and a second metal member closed in circular form and consisting of a strip having a much greater length than the first strip and having it too a width much smaller than its length, said first and second metal members being concentric and being rigidly connected to each other by a plurality of spokes. In the preferred embodiment, said spokes are metal sheet elements with C-shaped cross-sections, having the shape of isosceles trapezia in which the height is much greater than the major base. The major and minor bases of each element are rigidly connected to the circles formed by said strips of said first and second metal members, respectively, and are disposed along the length of said strips. Said first metal member consists of a strip closed in circular form and has rigidly connected thereto, in its central portion, a metal flange lying in the same plane as that formed by said first and second metal members.

Thanks to such a configuration, a perfectly flat structure is achieved for the wheel rake, so that the latter can be mounted without any difficulty on both the left side and the right side of any swather.

Of course, in accordance with the preferred embodiment, suitable means are provided for connecting the wheel rake to the swather arms. For instance, such means may consist of a counter-flange connected to a rotation pin arranged on one of the short am s placed along the swather arms.

Preferably said metal flange lies in the same plane as that formed by said first and second metal members and has a first central hole arranged to receive said rotation pin connected to a short arm for suspension of one of the swather arms, and a plurality of further holes, with smaller diameter than the first hole and concentrically arranged around it, in order to fasten the wheel rake to the swather.

In accordance with a further feature of the present embodiment, the wheel rake spokes are arranged so that the open part of their C-shaped cross section is alternately arranged on either side of the plane defined by said first and second metal members.

Such a constructional feature enables both faces of the wheel rake to have the same mechanical resistance to the side distortion.

Advantageously, in order to prevent the spokes from collecting fodder blades, which, by getting entangled in the spokes, could accumulate and hinder the proper swather operation, rigid disks of plastics can be used in known manner to protect the same spokes. To this end, each said spoke has, near its end fastened to said first metal member, a small metal plate, having a threaded or non-threaded bore and arranged so as to partly close the open side of the C. Preferably, one said disk of plastics is connected to said small strips.

Thus, it is an object of the present invention to solve the general technical problem described above by means of a plurality of technical solutions that, alone and/or in combination, are such that they make the possibility of working wider and wider cultivated areas in more and more reduced working times more and more effective.

According to the present invention, this object is achieved by means of a swather having the features set forth in the appended claims.

The present invention also concerns a device for arms with wheel rakes and wheel rakes that can generally be applied to swathers.

BRIEF DESCRIPTION OF THE FIGURES

The above and other features and advantages of the invention will become apparent from the following description of preferred embodiments made by way of a non-limiting example with reference to the accompanying drawings, in which elements denoted by a same or similar reference numeral correspond to elements having the same or similar function and construction, and in which:

FIG. 3b is a plan view of the mechanism shown in FIG. 3a;

FIG. 5 is a perspective view of a detail of the locking mechanism shown in FIG. 3a;

FIG. 6 is a perspective view of a further detail of the locking mechanism shown in FIG. 3a;

DESCRIPTION OF PREFERRED EMBODIMENTS

Figure 1:
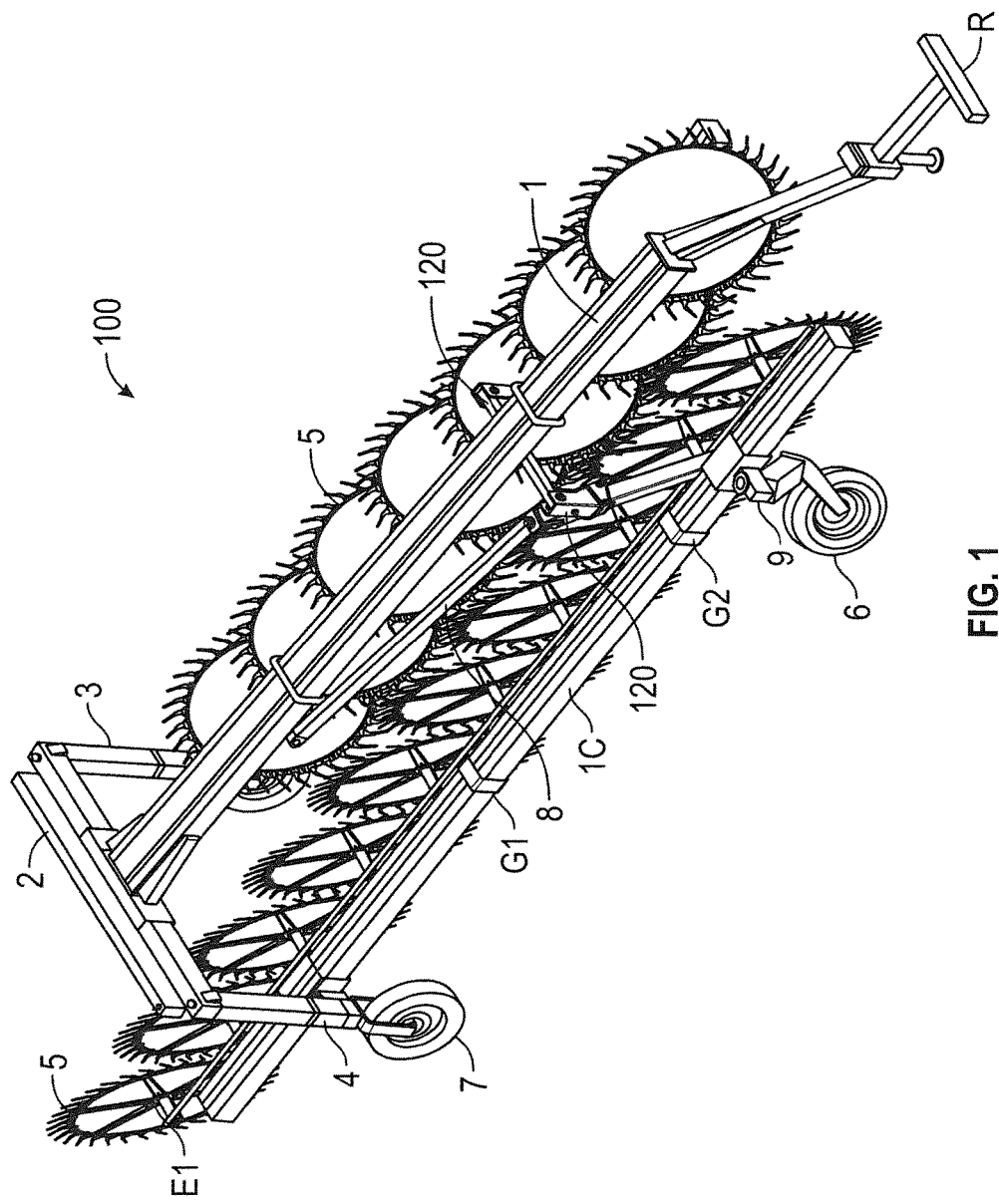
FIG. 1 shows a swather according to the present invention, including a locking mechanism.

Referring to FIG. 1, a swather 100 according to the present invention is for instance a swather with Y-shaped configuration, that is, it has two arms with wheel rakes 5. Only one arm, denoted by reference numeral 10, is shown for the sake of convenience of description.

In the embodiment shown by way of example the arms have different lengths. The first arm 10 is pivotally connected at one end on a vertical member 3, and the second arm is pivotally connected, at a distance from one end thereof, on a second vertical member 4 supported by a horizontal support bar 2.

Thanks to such a structure, when the arms are opened to a working position by means of an actuating device 8, one end E1 of the first arm 10 covers the corresponding end (not shown) of the second arm, so that wheel rakes 5 of both arms entirely cover the space between the arms themselves, thereby collecting all fodder lying between the arms and arranging it into an ordered windrow.

Horizontal bar 2 supporting vertical members 3, 4 is fastened to one end of a horizontal bar 1 having at another end R means for connection to a towing vehicle, preferably a tractor.

Horizontal bar 1 is also connected to actuating devices 8 arranged to control the opening and closing of arms 10 with wheel rakes 5.

Figure 2:
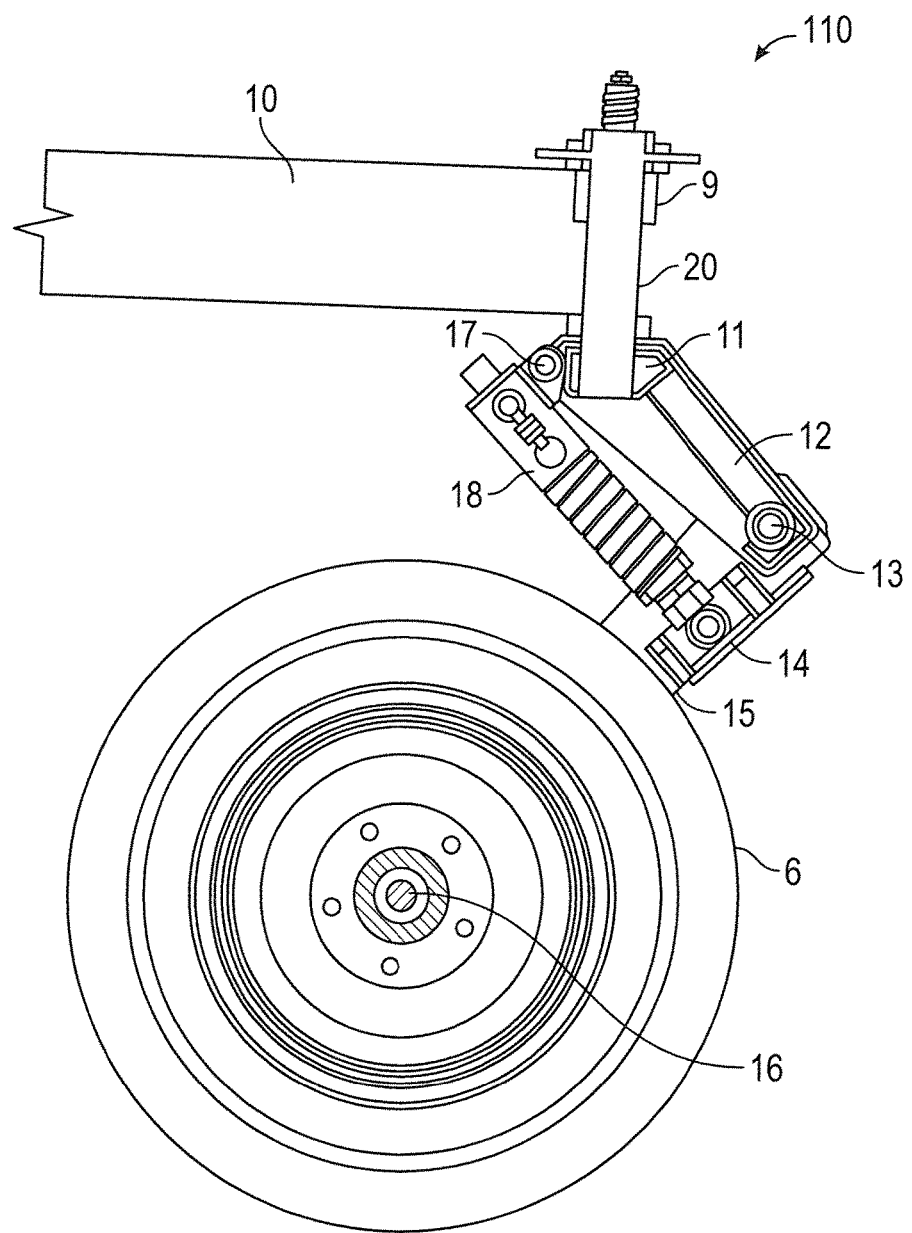
FIG. 2 shows a shock absorbing device that can he applied to the swather shown in FIG. 1.

In accordance with the preferred embodiment of the present invention, the whole of the structure of swather 100 is supported by two pairs of pivoting wheels with tyres 6 and 7. Only one wheel of each pair is shown for the sake of convenience of description. Each wheel has a hub 16 (FIG. 1, FIG. 2).

Preferably, the pair of wheels denoted by reference numeral 7 is located in correspondence of vertical members 3, 4, and the wheels denoted by reference numeral 6 are instead located near the distal ends of arms 10.

In general, bar 1 and arms 10, which can be several metres long, are formed by joining, by means of flanges and bolts, box-type elements having a shorter length than the overall bar or arm length. Such joints are for instance of the kind shown in FIG. 1, where they are denoted G1 and G2 for arm 10, but similar joints arc generally present also on the non-visible arm.

Due to such a constructional need, the provision of joints G1, G2 makes the arms sensitive to possible sudden jolts during use due to ground roughness, above all by taking into account that joints G1, G2 are preferably secured by means of bolts that, of course, can also loosen.

Thus, the problem exists that arms 10 can undergo, in use, even severe damages due to the loosening of joints G1, G2, thereby compromising the continuity of the work and also the physical integrity of the operators themselves.

In order to solve such a technical problem, the Applicant has provided shock absorbing devices 110 for at least one said pair 6 and/or 7 of wheels with tyres, in order to eliminate the drawbacks mentioned above.

A possible embodiment, considered as preferable, is depicted in FIG. 2.

In accordance with the exemplary embodiment shown therein, shock absorbing device 110 includes a support column 9, having for instance a substantially vertical axle 20 secured to arm 10.

A bushing 11 is rotatably mounted near the lower end of axle 20 and has fastened thereto a short arm 12 inclined, for instance by an angle in the range 30° to 60°, relative to the vertical direction, or in other words inclined downwards. Short arm 12 is for instance pivotally connected, by means of a rotating hinge 13, to a second short arm 14, preferably connected to hub 16 of wheel 6 by means of a further arm 15.

In the preferred embodiment, a resiliently deformable member 18 is connected between short arm 14 or arm 15 and a hinge 17, located in correspondence of bushing 11.

In the most preferred embodiment, resiliently deformable member 18 includes the assembly of a spring and a shock absorber; yet, any other element having similar shock absorbing characteristics can he used to make the shock absorbing device.

Thanks to such a shock absorbing device 110 of a pivoting kind and having an inclined action, it is possible to avoid problems of even severe damages resulting from the loosening, in use, of joints G1, G2 provided in order to allow using, in the swathers, bars having a length exceeding the length attainable with a single-piece bar.

In accordance with a second embodiment, swather 100 includes a locking/unlocking device or locking means 120. The device is applicable to swathers with both Y-shaped configuration, where arms 10 bearing wheel rakes 5 have different lengths, and V-shaped configuration, where the arms have the same lengths. For instance, one arm is pivotally connected at one end on vertical member 3, and the other arm is pivotally connected at a distance from one end thereof to vertical member 4.

Thanks to such a configuration, when the arms are opened to their working position by means of actuating device 8, end E1 of arm 10 covers the corresponding end (not shown) of the other arm, so that wheel rakes 5 of both arms cover the entire space between the arms themselves, thereby collecting all fodder lying between the arms and arranging it, in a known manner, into an ordered windrow.

Vertical members 3, 4 are connected to a second horizontal bar 2 fastened to one end of a first horizontal bar 1 equipped at the other end R with means for connection to a towing vehicle, preferably a tractor.

Such a first horizontal bar 1 is also associated with actuating devices 8 for controlling the opening and closing of the arms hearing the wheel rakes (only one arm, denoted 10 in FIG. 1, being shown).

The whole of such a structure is supported by two pairs of pivoting wheels with tyres 6 and 7 (only one wheel of each pair being shown in FIG. 1), wheels 7 being located in correspondence of vertical members 3, 4, and wheels 6 being instead located near the distal ends of arms 10.

FIGS. 3a, 3b, 4a, 4b show the operation of device 120 according to the present invention. Arms 10 are associated with a first portion of said means for locking and retaining the arms against said first horizontal bar 1. More precisely, said arms are associated with a small arm 21 that:
 can be supported by a member 26 with generally C-shaped cross-section; and
 can rotate in a vertical plane about an axis 27 in said member 26.

Of course, other solutions may be adopted for arranging said small arm 21 on arm 10.

Small arm 21 is kept in a generally horizontal position by resilient means, anyway so that it is free to rotate about axis 27 when suitably biased.

Small arm 21 bears, at its end opposite the end at which it is connected to member 26, a short small cylinder 22, ends 22c of which are bevelled.

Figure 6:
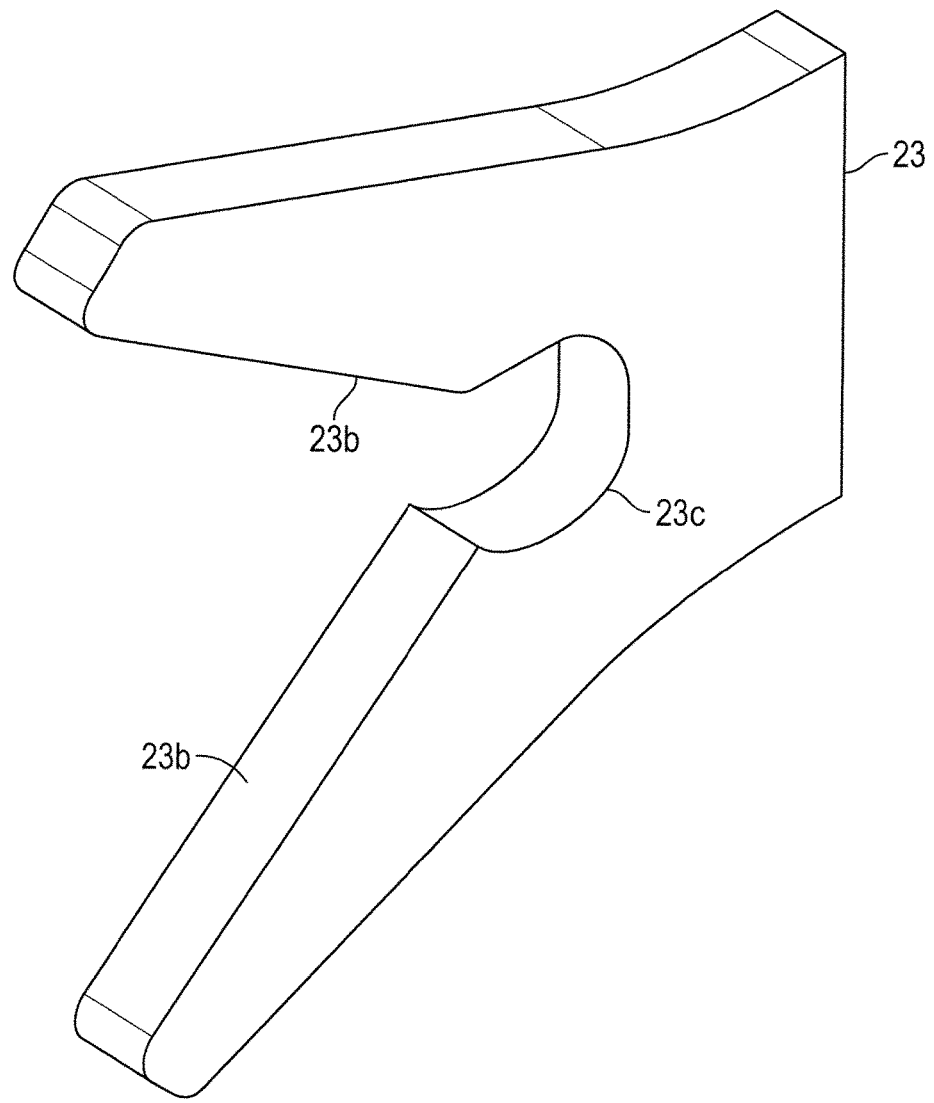

A second portion of said means for locking and retaining the arms against said first horizontal bar 1 is located on the bar itself and essentially consists of the cooperating combination of:
 a first stationary strip 23, having one end connected to the first horizontal bar and a free second end, directed towards said arm with wheel rakes and having a wide V-shaped cut with horizontal axis, the tip portion of which has a circular recess (FIG. 6), arranged to receive the short small cylinder located on said small arm;

a second strip 24, it too vertical and having one end connected to the first horizontal bar and a free second end directed towards said arm with wheel rakes, the second strip being partly adjacent to the first strip 23, being rotatable about a vertical axis (not shown), being kept close to said first strip by a resilient member (not shown) and being shaped so that a portion 24a of its free end is bent so as to be directed away from the free end of said first strip; said second strip is provided, in correspondence of the circular recess at the tip of the V-shaped cut of the first strip, with a slot-shaped through hole 28, arranged to receive said short small cylinder located on said small arm.

Figure 3A:
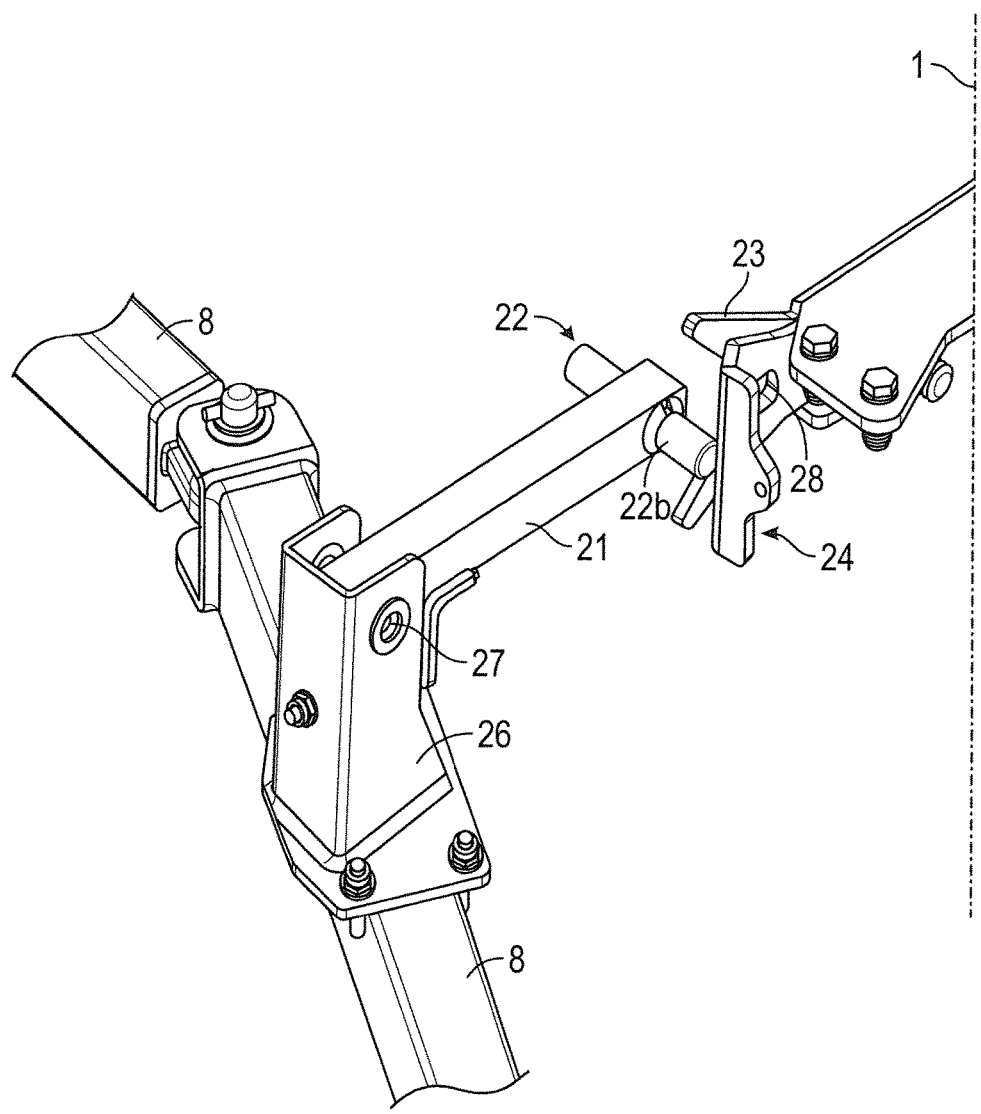
FIG. 3a is a perspective view of a locking mechanism including a locking small arm for the arms with wheel rakes.
Figure 3B:
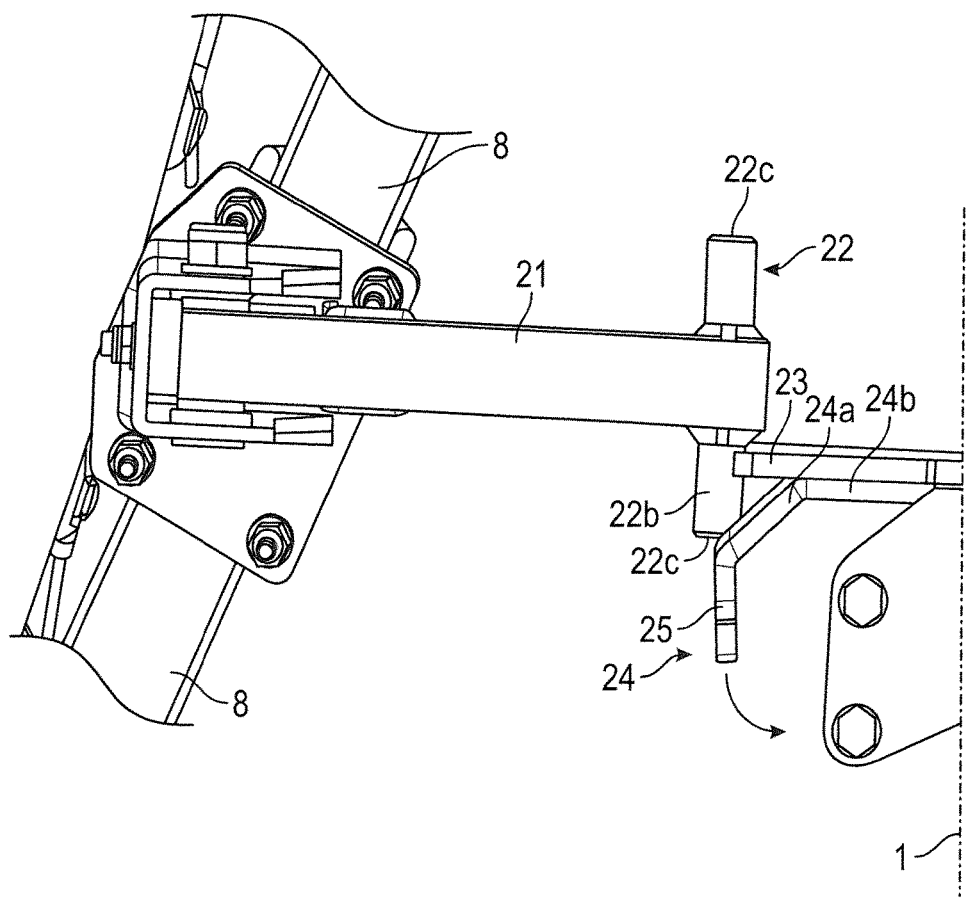
Figure 4A:
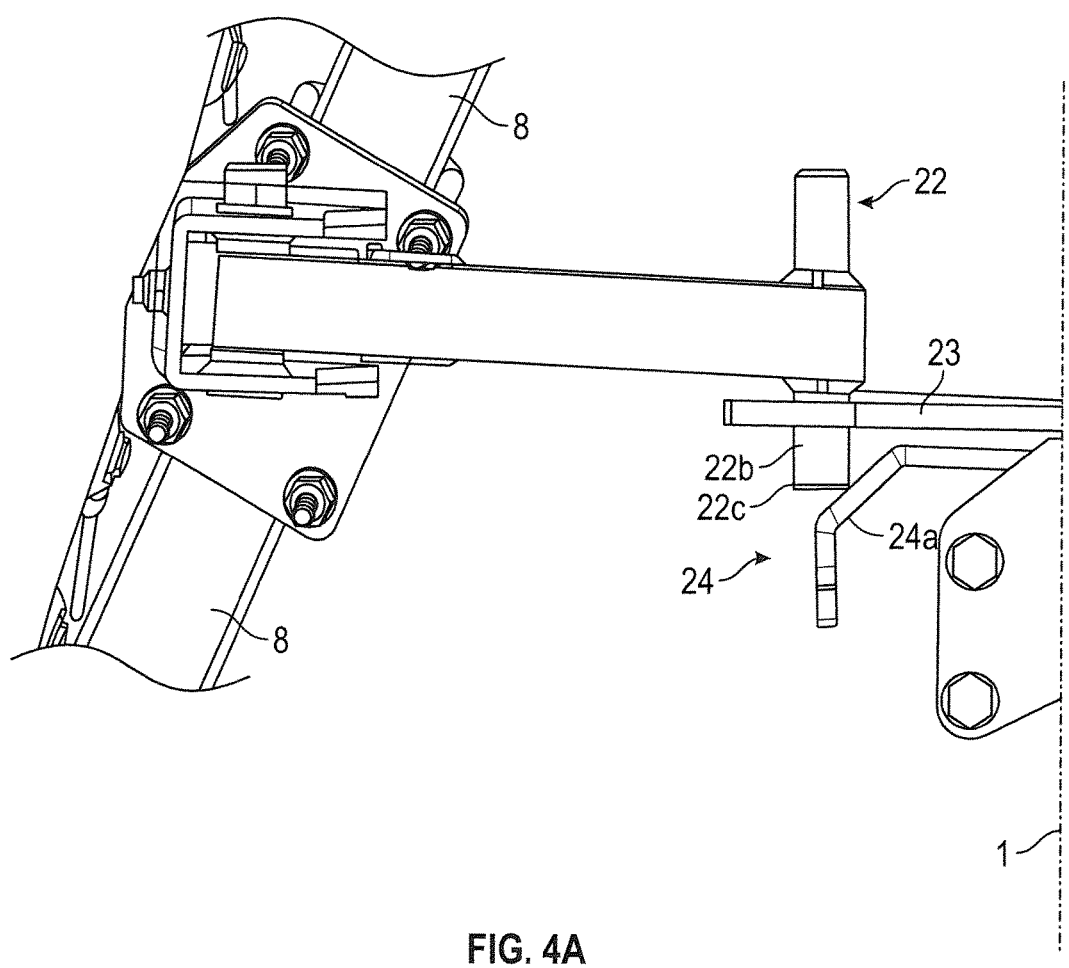
FIG. 4a is a plan view similar to FIG. 3b, in which however the small arm has further moved towards the locked position.
Figure 4B:
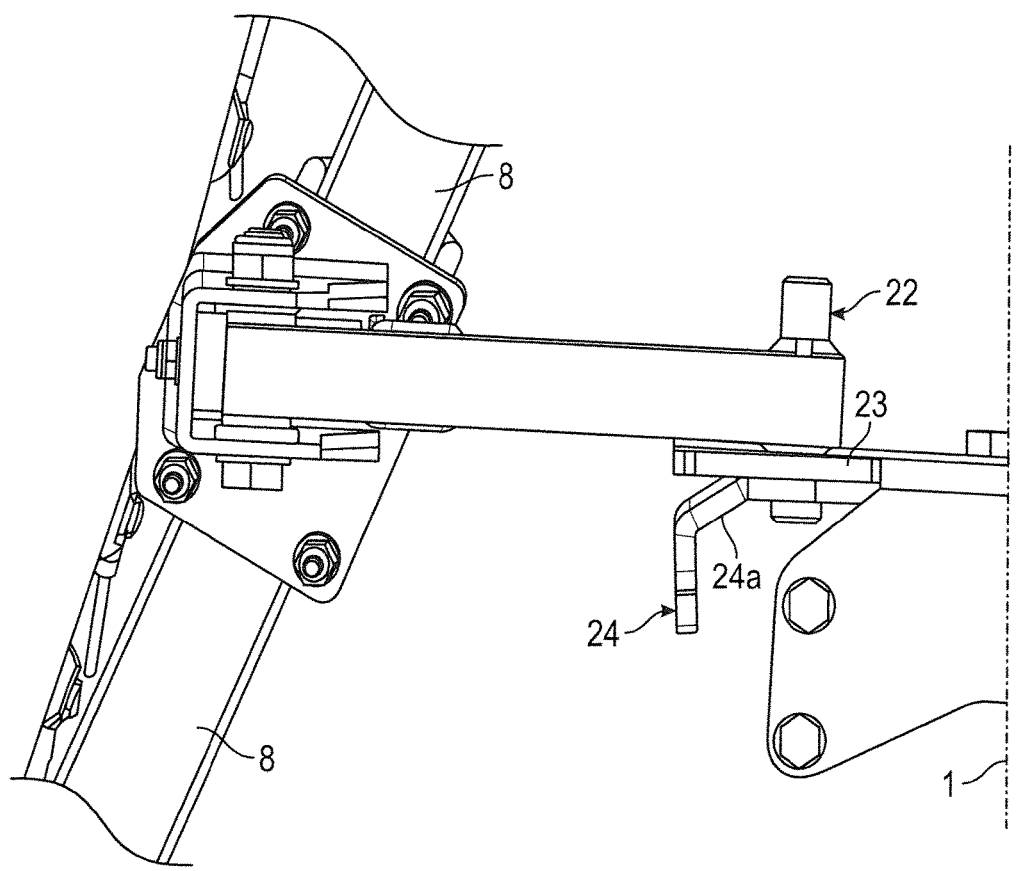
FIG. 4b is a plan view of the mechanism shown in FIG. 4a, with the small arm in the locked position.

As shown in FIG. 3b, while arm 10 is approaching bar 1, small cylinder 22 located on small arm 21 contacts bent portion 24a of strip 24 with bevelled portion 22c of cylinder half 22b, and begins making the strip rotate against the thrust of said resilient member, as shown in FIG. 4a. While arm 10 continues approaching bar 1, bevelled end 22c of small cylinder 22 moves beyond bent portion 24a of strip 24, stops in the circular recess and is located in correspondence of slot-shaped hole 28 in strip 24. Said resilient member brings strip 24 back to its starting position, in contact with strip 23, thereby introducing small cylinder 22 into slot-shaped hole 28, as shown in FIG. 4b, and attaining a secure locking of arm 10 against bar 1.

Figure 5:
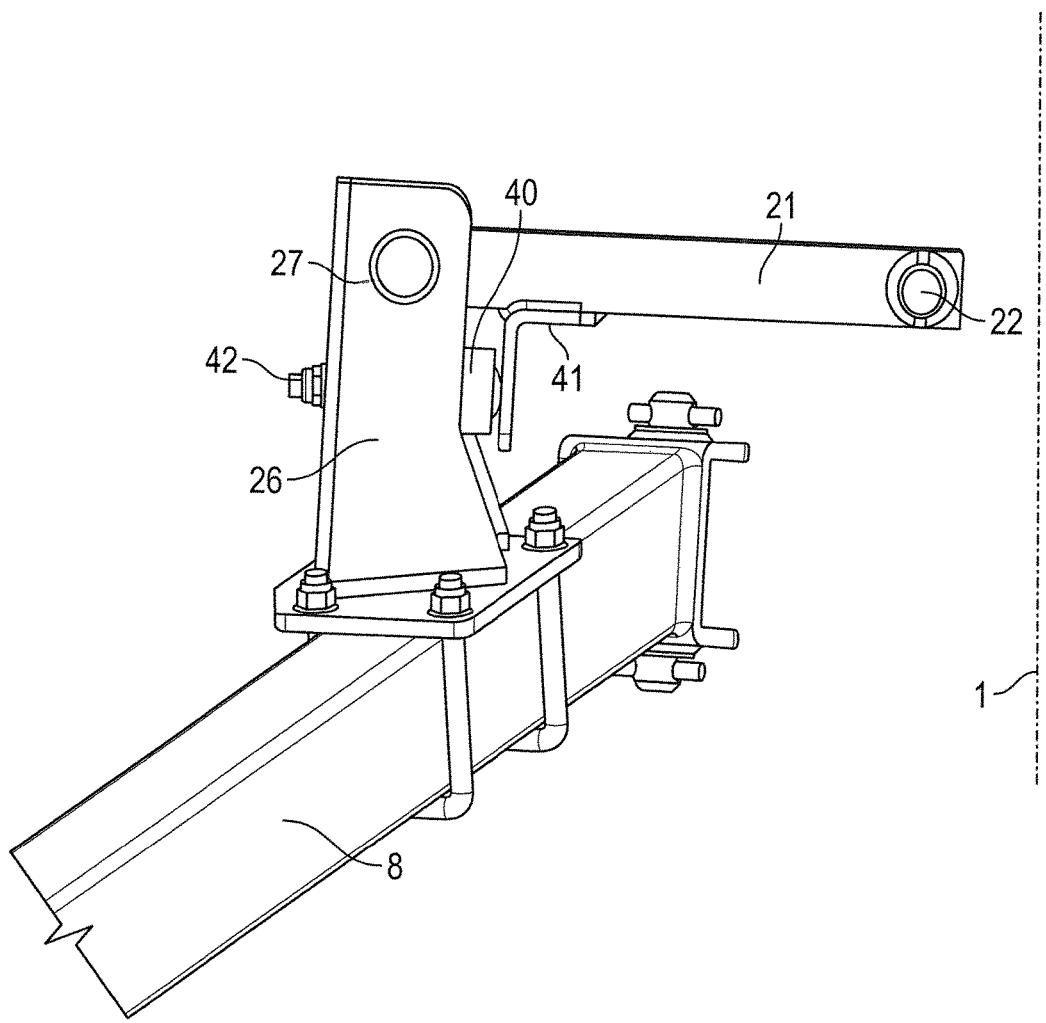

FIG. 5 shows a preferred embodiment of the resilient member mentioned above. Such a member includes a fastened adjustable spring arranged within a bowl 40 and adjusted by means of nut 42 so as to abut against abutment 41 secured to small arm 21, in order to keep same in a substantially horizontal position. In use, when small cylinder 22 arrives in correspondence of the V-shaped cut in strip 23, it can proceed straight on towards circular recess 23c (FIG. 6) or, if it is not perfectly aligned, it can engage one of the internal walls 23b of said V-shaped cut at any point thereof. In such case, the resilient member allows small arm 21 to be raised or lowered in order to be able to slide towards said recess 23c.

That second embodiment is therefore capable of greatly improving the easiness and safety of use of a swather, by allowing an easy and safe opening and closing thereof.

Figure 7:
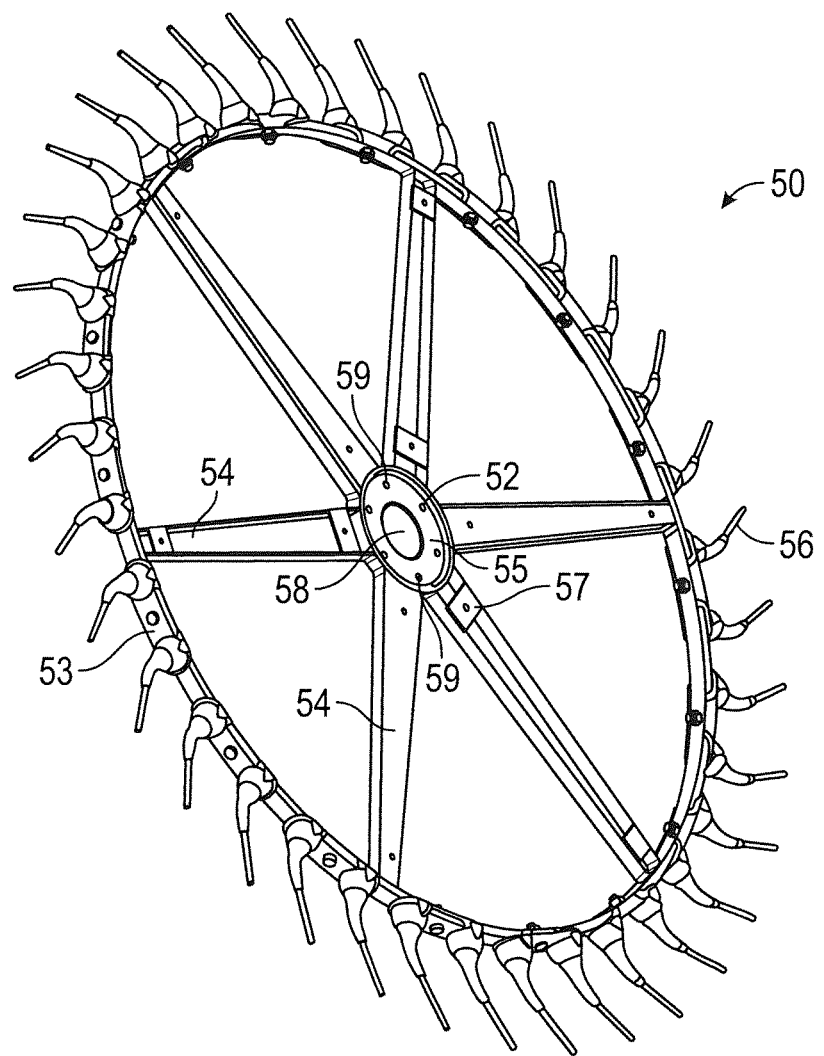
FIG. 7 is a perspective view of a flanged wheel rake for swathers, made in accordance with a third embodiment of the present invention.

In accordance with a third embodiment of the present invention, shown in FIG. 7, the swather is also equipped with novel wheel rakes, which can be applied, inter alia, also to swathers with known V-shaped or Y-shaped configuration.

In accordance with such an embodiment, wheel rake 50 according to the present invention includes a first metal member 52 consisting of a strip formed in circular shape. A metal flange 55 is arranged within the circle formed by said strip and is rigidly connected to the strip. The flange has a central hole 58 arranged to house a rotation pin (not shown) and a plurality of holes 59 with smaller diameter than said hole 58, concentrically arranged around said hole.

A plurality of spokes 54 are rigidly connected to said first metal member 52, said spokes having the shape of elongated isosceles trapezia, the major bases of which are connected to said first member 52 and are disposed along the length of the strip forming said first member 52. Said spokes are formed of a metal sheet shaped as an isosceles trapezium and they have C-shaped cross-sections. A small plate 57, located between the ends of the C-shaped spoke body, is rigidly connected to each spoke 54 near said first metal member and is provided with a bore, preferably a threaded bore.

A second metal member 53, consisting of a strip formed in circular shape and equipped with a plurality of projections 56 formed by shaped metal rods and mounted on a base of hard rubber or other suitable material, is rigidly connected to the minor bases of said spokes 54.

As shown in FIG. 7, the first metal member, the second metal member, the central metal flange and the spokes form a body that has a substantially planar configuration and is therefore suitable for being mounted without any operating limitation on both the left side and the right side of a swather.

Of course, obvious modifications and/or changes can be made to the above description in respect of the sizes, the shapes, the materials and the connections as well as in respect of the details of the illustrated construction and the operating manner, without departing from the invention as claimed in the following claims.

The invention claimed is:

1. A swather including a first horizontal bar having at a first end a device for connection to a towing vehicle and at an opposite end a transverse horizontal bar, transverse to the first horizontal bar, of which each end is connected with a vertical member bearing a pivoting wheel equipped with a tyre, an assembly of the transverse horizontal bar and the vertical members being connected with horizontal arms which are each several meters long, are each formed by joining together multiple elements having a length shorter than an overall horizontal arm length, and are directed toward said first end of the first horizontal bar and pivotally connected to the transverse horizontal bar or the vertical members, so that said horizontal arms, when extended to a working position, can make the assembly take a V-shaped or Y-shaped configuration, each of said horizontal arms being equipped with a pivoting wheel with a tyre at a distal end thereof remote from said transverse horizontal bar, and with a plurality of wheel rakes, wherein at least the pivoting wheels with tyres located at or near the distal ends of said horizontal arms are each equipped with a shock absorbing device, capable of attenuating impulsive loads due to impact of the wheels themselves against irregularities of the ground, wherein each of said shock adsorbing devices includes a support column having a vertical axle secured to said horizontal arm and a bushing being rotatably mounted near the lower end of said vertical axle of said support column, wherein said bushing has fastened thereto a first arm extending away from the circumference of the bushing and inclined downwardly to the ground by an angle in a range of 30° to 60° with respect to the vertical axle and having a first end pivoting about the vertical axle and a second end pivotally connected by a rotating hinge to a second arm arranged at a right angle relative to the first arm, a distal end of said second arm being connected by a further arm to a hub of the wheel with tyre located at or near the distal end of said horizontal arm, and wherein near its articulation with said first arm, said second arm has pivotally mounted thereon a resiliently deformable member, parallel to said first arm and connected to a hinge located in correspondence of said bushing opposite to said support column with respect to said first end of said first arm.

2. The swather according to claim 1, wherein said resiliently deformable member comprises a spring.

3. The swather according to claim 1, wherein said resiliently deformable member comprises a shock absorber.

4. The swather according to claim 1, wherein said resiliently deformable member consists of a spring-shock absorber assembly.

5. The swather according to claim 1, wherein both the pivoting wheels with tyres located at or near the distal ends of said horizontal arms and the wheels located in correspondence of the vertical members are equipped with the shock absorbing device, capable of attenuating impulsive loads due to impact of the wheels themselves against irregularities of the ground.

6. The swather according to claim 2, wherein both the pivoting wheels with tyres located at or near the distal ends of said horizontal arms and the wheels located in correspondence of the vertical members are equipped with the shock absorbing device, capable of attenuating impulsive loads due to impact of the wheels themselves against irregularities of the ground.

7. The swather according to claim 3, wherein both the pivoting wheels with tyres located at or near the distal ends of said horizontal arms and the wheels located in correspondence of the vertical members are equipped with the shock absorbing device, capable of attenuating impulsive loads due to impact of the wheels themselves against irregularities of the ground.

8. The swather according to claim 4, wherein both the pivoting wheels with tyres located at or near the distal ends of said horizontal arms and the wheels located in correspondence of the vertical members are equipped with the shock absorbing device, capable of attenuating impulsive loads due to impact of the wheels themselves against irregularities of the ground.

* * * * *